US 6,708,854 B2

(12) United States Patent
Sut

(10) Patent No.: US 6,708,854 B2
(45) Date of Patent: Mar. 23, 2004

(54) DISPENSER OF SUBSTANCES FOR AGRICULTURAL USES

(75) Inventor: Livio Sut, Pordenone (IT)

(73) Assignee: Bassi Vasco & Bassi Gianluca SNC, Bologna (IT)

( * ) Notice: Subject to any disclaimer, the term of this patent is extended or adjusted under 35 U.S.C. 154(b) by 0 days.

(21) Appl. No.: 10/460,190

(22) Filed: Jun. 13, 2003

(65) Prior Publication Data

US 2004/0007591 A1 Jan. 15, 2004

(30) Foreign Application Priority Data

Jul. 11, 2002 (IT) ....................... PN2002A0054

(51) Int. Cl.⁷ .............................................. G01F 11/20
(52) U.S. Cl. ...................... 222/414; 222/565; 111/177; 209/679
(58) Field of Search ................................ 222/565, 485, 222/478, 144.5, 333, 144, 121, 414; 111/170, 177, 171, 178; 209/679, 680, 666, 684; 221/211, 265

(56) References Cited

U.S. PATENT DOCUMENTS

| 2,306,748 A | * | 12/1942 | Peterson ...................... 222/288 |
| 3,074,727 A | * | 1/1963 | Sosalla et al. ............ 239/590.5 |
| 4,206,857 A | * | 6/1980 | Gregory et al. ............. 222/625 |
| 5,873,533 A | * | 2/1999 | Sandbrook .................. 239/689 |
| 6,269,758 B1 | * | 8/2001 | Sauder ....................... 111/177 |

* cited by examiner

Primary Examiner—Gene Mancene
Assistant Examiner—Frederick C Nicolas
(74) Attorney, Agent, or Firm—Wenderoth, Lind & Ponack, L.L.P.

(57) ABSTRACT

A dispenser of substances for agricultural uses, to include a container (10) for holding the substances to be dispensed, a rotator (17) that is rotatably inside the container and provide with a cladding (20) of soft material, and a guiding disc (14) provided with apertures for unloading the substances down towards the soil. The rotator (17) is associated with adjustment mechanisms (18, 19) that are actuatable in view of displacing the rotator along the axis of rotation thereof and causing it to selectively move into differentiated positions so as to enable substances having different physical characteristics to be dispensed.

8 Claims, 4 Drawing Sheets

DISPENSER OF SUBSTANCES FOR AGRICULTURAL USES

The present invention refers to a an adjustable dispenser for granular substances, such as seeds, fertilizers and the like, to be used for agricultural purposes.

Dispensers of the above cited kind have been known for a long time now and, in particular, they are used to evenly distribute the substances along several different rows. These dispensers are of either a mechanical or a pneumatic kind, depending on the type of operation thereof.

Mechanical dispensers are generally formed by a container, into which the granules of the substance to be dispensed are filled, and a motor-driven rotator, which feeds said granules through a plurality of outlets so as to let them fall on the ground.

The main problem encountered with these dispensers is due to the requirement that they provide as high an extent as possible of evenness in the distribution of the substances being dispensed, regardless of their being seeds, granular fertilizers or the like, in order to allow for a regular growth of the crops, i.e. the agricultural products being cultivated. Similarly important is the problem connected with the fact that these dispensers should possibly be designed as multi-functional units, i.e. units that are capable of being adapted to dispense differently shaped and sized seeds and granular substances.

The patent publication DE 932 040 describes a dispenser in which, within the container, there is a rotatable, a cone-shaped, vertical-axis rotator which cooperates with a wheel that is rotatable about a horizontal axis so as to unload a single seed at a time onto the ground. A similar solution is described in the patent publication GB 417,942, in which the wheel for sorting and unloading the seeds is replaced by the lower rim of the rotator, which is provided with recesses, or impressions, adapted to accommodate individual seeds. An arrangement is disclosed in this patent, which is provided with two dispensers that are operated by a single driving shaft through appropriate motion transmission mechanisms of the bevel gear pair type.

The patent publication U.S. Pat. No. 3,347,426 describes a precision seeder, in which the seeds are sorted with the help of a cylindrical rotator provided with a cladding of soft material and adapted to rotate about a horizontal axis. Finally, the patent publication EP 0 769 896 differs from the above cited one in that the rotator, still having a cylindrical shape and a cladding of soft material, is adapted to rotate about a vertical axis and cooperates with a disc-shaped peripheral guide, on the inner surface of which there are provided recesses, or impressions, for sorting and unloading the seeds.

All of the above-discussed prior-art dispensers share the drawback of necessarily requiring the rotator to be replaced when changing over to the distribution of a different product, i.e. a product having a different size or shape with respect to the previously dispensed substance. In other words, if the need arises for the type of seeds to be changed, or when a granular fertilizer must be dispensed instead of seeds, it is necessary for an entire set of specific rotators to be available, which must then be duly mounted in the dispenser under a considerable waste of time and a lot of physical effort.

Nor should the problem of the operating timeliness in the case of seeding be forgotten, either. Seeding is in fact a process that requires the utmost rapidity in adjusting the dispenser, considering the persisting need for due advantage to be taken each time from the most favourable weather conditions.

SUMMARY OF THE INVENTION

It therefore is a main purpose of the present invention to provide a dispenser of seeds, fertilizers and the like, which is really multi-functional thanks to its being adjustable in accordance with the various types and kinds of substances to be dispensed, without any need arising for the mechanical parts that make up the same dispenser to be replaced.

A further purpose of the present invention is to ensure a more accurate and even sorting of the products to be dispensed, through the use of a single, particularly shaped rotator provided with a cladding of soft material, which enables the products themselves to be stirred within the container and ejected onto the soil without giving rise to any cavitation effect in the mass of the same products due to the products being drawn in from below.

Yet, a further purpose of the present invention is to provide a dispenser that enables a plurality of furrows in the soil to be fed (i.e., sown) at the same time, so as to achieve a plurality of cultivated rows, with the aid of a control device that is simple and reliable.

The present invention also enables different doses of the same product or substance to be dispensed by adjusting the dispenser and, therefore, the interference between the rotator and the guiding disc, without having to act on the motor drive (i.e. by changing the speed stage of a transmission gear, adjusting the revolution speed of the motor or the like).

BRIEF DESCRIPTION OF THE DRAWINGS

The above features and advantages of the present invention may be more readily understood from the description that is given below by way of a non-limiting example with reference to the accompanying drawings, in which.

DETAILED DESCRIPTION OF THE INVENTION

Figure 1:
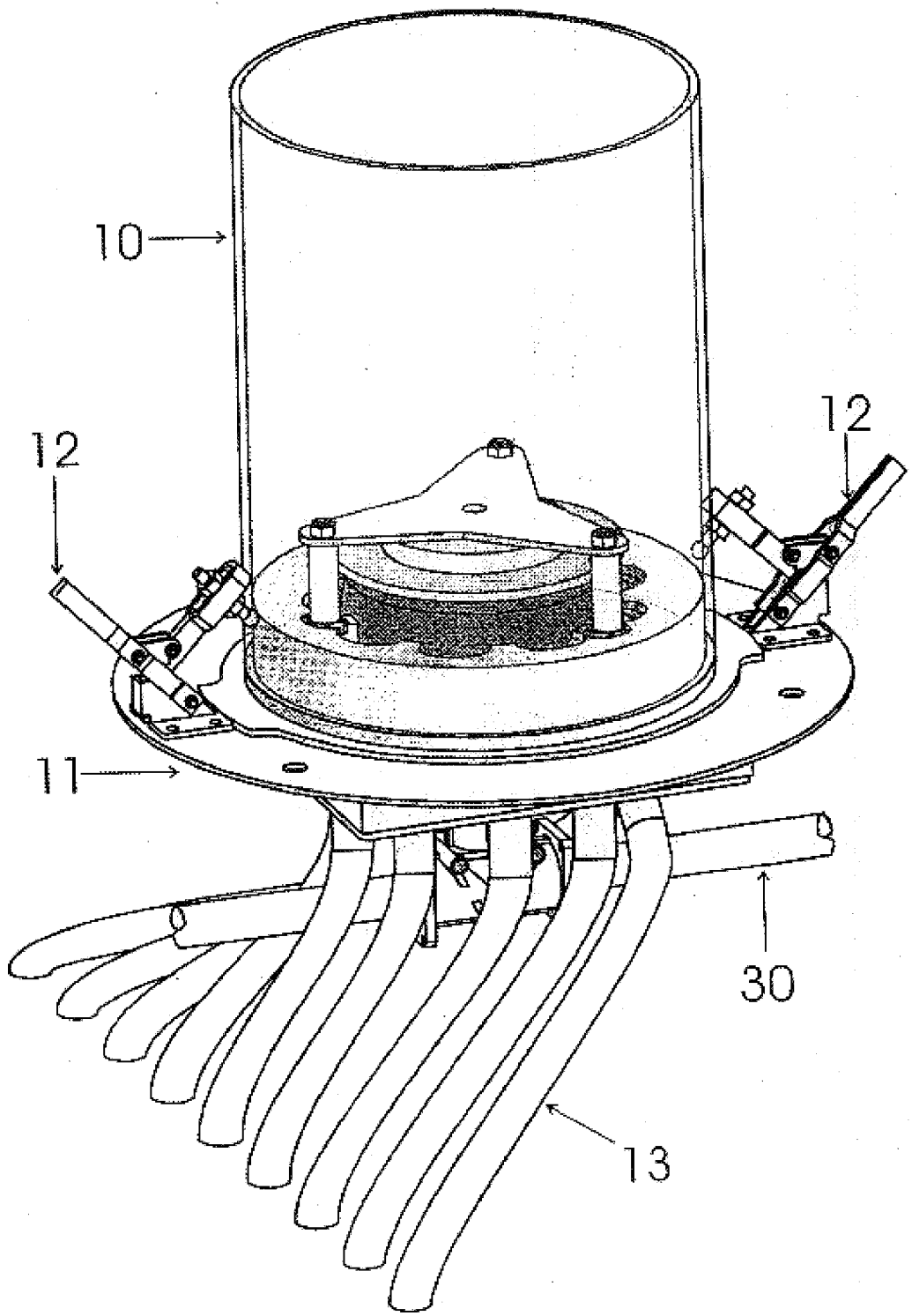
FIG. 1 is a perspective view of a dispenser according to the present invention.

An overall view of a dispenser according to the present invention is illustrated in FIG. 1, in which there is shown a container 10, in which the substances to be dispensed are filled, regardless of such substances being granular, such as differently sized and shaped seeds, or fertilizers in the form of more or less fine powder; a disc 11 supporting the container, and provided with appropriate levers 12 for the attachment of the container to the disc; and a set of conduits 13 from which the substances to be dispensed are ejected towards the soil.

Figure 2:
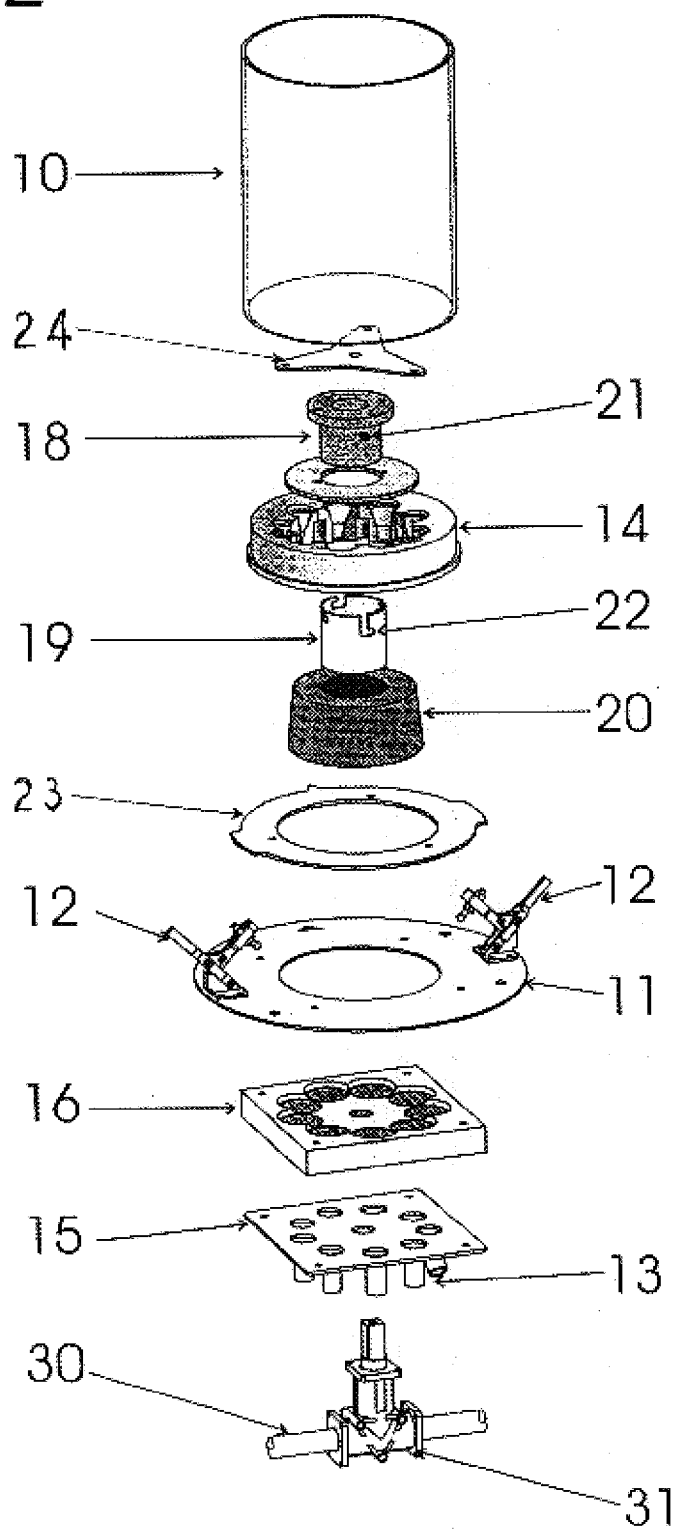
FIG. 2 is an exploded perspective view of the dispenser shown in FIG. 1.

The construction details and component parts of the dispenser according to the present invention are clearly illustrated in FIG. 2. On the bottom of the container 10, above the support disc 11, there is mounted in a fixed position a guiding disc 14, the inner annular surface of which is so shaped as to feature an array of recesses adapted to collect the substances to be dispensed. These recesses are provided in an alternating arrangement with apertures, each one of which is connected with one of the unloading conduits 13 branching off in an orderly manner from a perforated plate 15. Therefore, the passage of the substances to be dispensed from the container 10 into the conduits 13 occurs through the disc 14 and, preferably, a multiple-aperture collecting device 16 that is arranged between the disc 14 and the plate 15. The apertures in this collecting device 16 correspond, of course, to the recesses and the apertures in the guiding disc 14, as well as the perforations in the plate 15.

Within the guiding disc 14 there is mounted a rotator 17 that is characterized in that it is constituted by an inner bushing 18, an intermediate sleeve 19 and an outer cladding 20. The bushing 18 is provided with a stud 21 that protrudes radially from the outer surface of the same bushing. The sleeve 19 is provided, on the cylindrical surface thereof, with a series of L-shaped open grooves or slots 22 having different axial lengths, in which the stud 21 of the bushing 18 is capable of engaging selectively.

The arrangement is completed by a fastening disc 23 and a member 24 for supporting the rotator 17. The bushing 18 is hinged on to said support member 24.

Finally, the outer cladding 20, which is made of a soft, elastic material, is in the shape of a truncated cone and is adapted to cooperate with the inner surface of the guiding disc 14 to agitate, sort and unload the substances contained in the container 10.

Figure 3:
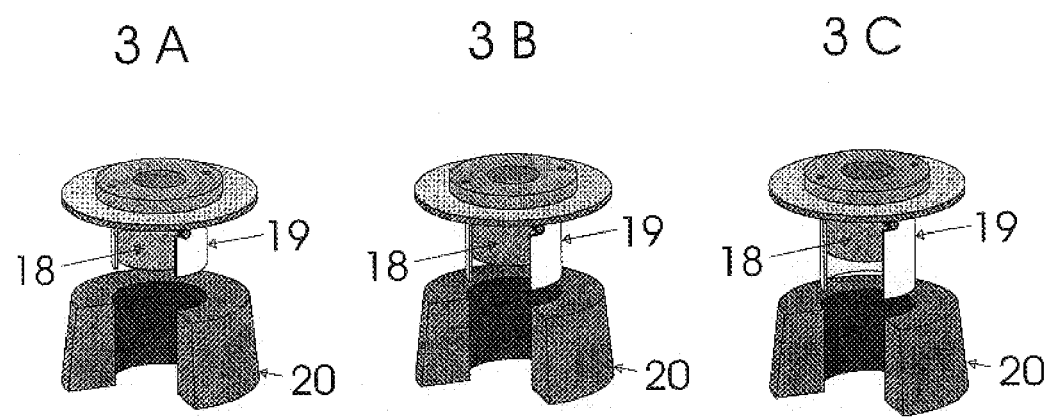
FIGS. 3A, 3B and 3C are exploded perspective views of a detail of the dispenser according to the present invention, with the rotator thereof in three different adjustment positions.

The peculiar feature of the present invention is represented by the ability to adjust the axial position of the rotator 17 in relation to the guiding disc 14, so as to vary the clearance or the interference between the respective interacting surfaces accordingly. As shown in FIGS. 3A to 3C, this adjustment is achieved by causing the bushing 18 to rotate and letting the stud 21 engage the slot 22 corresponding to the desired axial position.

Figure 4:
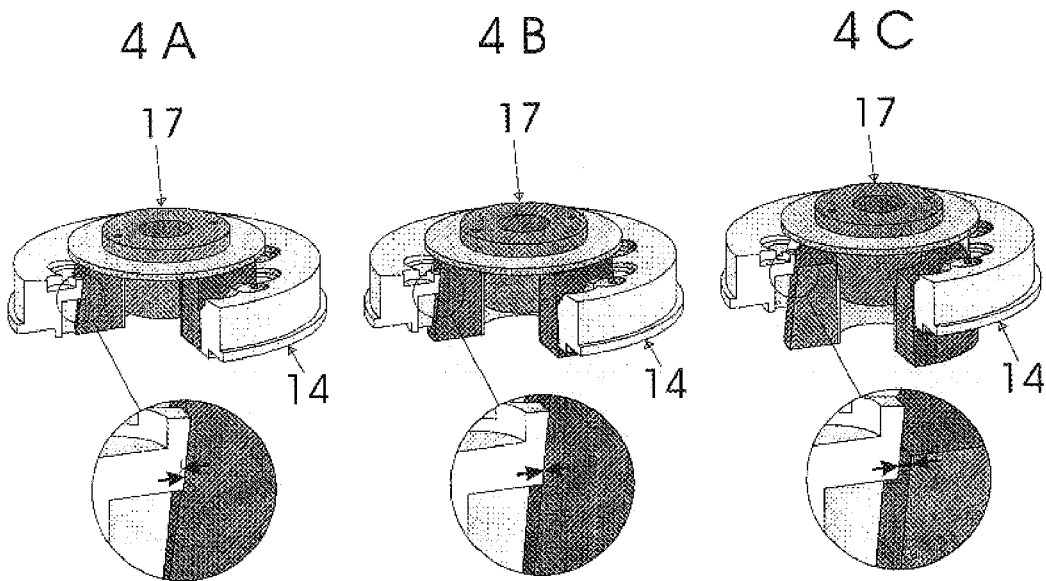
FIGS. 4A, 4B and 4C are perspective views of a detail of the dispenser according to the present invention in three different adjustment conditions thereof.

Correspondingly, the interacting surfaces of the rotator 17 and the guiding disc 14 are able to interfere with each other (FIG. 4A), be simply in contact with each other (FIG. 4B) or, finally, be spaced apart from each other. The interference is allowed for by the fact that the cladding 20 of the rotator is made of a soft, elastic material. The three above mentioned situations are provided to be brought about in view of dispensing substances in powder form, substances in the form of seeds or differently sized granules, respectively.

The described example refers to a frusto-conical rotator and a cylindrical guiding disc, with three adjustment positions thereof. However, it can be readily appreciated that the guiding disc may also have an inner surface in the shape of a truncated cone, and the adjustment positions may be provided in a different number, according to the number of slots that are provided in the sleeve 19. In addition, the rotator and the disc may be tapered in both an upward and downward direction, and such a tapering direction may also be different in the two elements, depending on the metering effect to be achieved and the construction characteristics of the dispenser. In any case, at least the rotator must have a conical shape.

Furthermore, it is possible for the rotator 17 to be hinged on a pin that is fixed on the bottom, instead of the top thereof, and other variants can also be adopted. For instance, these variants can be adopted in accordance with the particular manner in which the machine is intended to be used, such as the need for changing the product to be dispensed and the frequency of such changes, the need of carrying out adjustments, and the frequency of such adjustments, and the capacity and the size of the container.

In the described example, the adjustment is carried out in a discrete form, i.e. in pre-established positions or settings. However, it can be readily appreciated that such an adjustment may also be carried out continuously, i.e. in a stepless manner. For this purpose, all it takes is to replace the coupling based on the stud 21 and slot 22 with a kind of coupling brought about by screwing-in the bushing 18 in the sleeve 19, wherein the respective contact surfaces of the bushing and the sleeve are appropriately threaded in this case.

In FIGS. 1 and 2 there is furthermore shown a drive shaft 30 which extends below the container 10 and which, through an appropriate transmission gear 31, transmits the rotary motion generated by a motor (not shown) to the rotator 17.

Hence, it can be stated that the dispenser according to the present invention is substantially constituted by a moving assembly, comprising the container 10, the support 24, the bushing 18, the guiding disc 14, the sleeve 19, the cladding 20 and the mounting disc 23, and a stationary assembly that is connected to the chassis of the machine and comprises the support disc 11, the levers 12, the collecting device 16, the perforated plate 15 and the conduits 13.

The moving assembly is mounted on and removed from the stationary assembly, according to the case, in a very simple and quick manner by means of the levers 12 that lock the mounting disc 23 in place. This solution enables the container to be unloaded, and the whole apparatus to be adjusted and maintained, in a very rational manner.

The drive motor and the transmission gear 31 may be of any of the number of known kinds and the control thereof is preferably of an electronic, microprocessor-based type. This solution enables a plurality of dispensers to be controlled at the same time, thereby ensuring the best possible synchronism of the same dispensers and, as a result, an improved evenness in the distribution of the substances being dispensed. It is of course possible for the various dispensers to be controlled selectively, in such a manner as to be able to let even different substances into the soil, using the most appropriate manner for each one of said substances.

Conclusively, it can therefore be stated that the dispenser according to the present invention is a really multivalent and versatile one and is adjustable in a simple and quick manner to be adapted to the different dispensing requirements, thereby doing away with the serious drawback shared by prior-art dispensers, which require the use of various sets of rotators sized so as to fit the different substances to be dispensed.

What is claimed is:

1. A Dispenser of substances for agricultural uses, comprising: a container for holding the substances to be dispensed; a rotator provided with a cladding of soft material, and capable of being driven rotatably about a vertical axis, said rotator being mounted inside said container; and a guiding disc having recesses and apertures for sorting and unloading the substances down into the soil, said rotator being adapted to cooperate with said guiding disc; wherien said rotator has a metering portion with a frusto-conical outer shape that is conjugated with the inner surface of said guiding disc, and said rotator is associated with an adjustment means that is actuatable to displace said rotator along the axis of rotation of said rotator and cause said rotator to selectively move into a differentiated position so as to enable differently sized and shaped substances in powder or granular form to be dispensed.

2. The Dispenser according to claim 1, wherein an inner surface of said guiding disc has a frusto-conical conformation.

3. The Dispenser according to claim 1, wherein said adjustment means for adjusting the axial position of said rotator is adapted to vary the degree of interference between an outer surface of said rotator and an inner surface of said guiding disc.

4. The Dispenser according to claim 3, wherein said adjustment means comprises a bushing having a stud, and comprises a sleeve having a plurality of grooves or slots having different axial lengths, said stud being adapted to be coupled to said slots.

5. The Dispenser according to claim 1, wherein said adjustment means comprises a threaded bushing adapted to be screwed in a correspondingly threaded sleeve.

6. The Dispenser according to claim 2, wherein said adjustment means comprises a threaded bushing adapted to be screwed in a correspondingly threaded sleeve.

7. The Dispenser according to claim 3, wherein said adjustment means comprises a threaded bushing adapted to be screwed in a correspondingly threaded sleeve.

8. The Dispenser according to claim 4, wherein said adjustment means comprises a threaded bushing adapted to be screwed in a correspondingly threaded sleeve.

* * * * *